(12) United States Patent
Zhang et al.

(10) Patent No.: US 8,263,007 B2
(45) Date of Patent: Sep. 11, 2012

(54) SLURRY BED LOOP REACTOR AND USE THEREOF

(75) Inventors: Zhanzhu Zhang, Beijing (CN); Lifeng Hu, Beijing (CN); Xiaojin Tang, Beijing (CN); Shaobing Wang, Beijing (CN); Shuandi Hou, Beijing (CN); Junyi Mao, Beijing (CN); Hongliang Qu, Beijing (CN)

(73) Assignees: China Petroleum Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 0 days.

(21) Appl. No.: 13/038,650

(22) Filed: Mar. 2, 2011

(65) Prior Publication Data
US 2011/0165029 A1 Jul. 7, 2011

Related U.S. Application Data

(62) Division of application No. 12/303,061, filed as application No. PCT/CN2007/001743 on May 31, 2007, now Pat. No. 7,919,536.

(30) Foreign Application Priority Data

May 31, 2006 (CN) .............................. 200610083439

(51) Int. Cl.
*B01J 8/20* (2006.01)
(52) U.S. Cl. ........ 422/140; 422/145; 422/147; 422/227; 422/228; 422/234; 518/700
(58) Field of Classification Search .................. 422/140, 422/147, 227, 234, 145, 228; 518/700, 701
See application file for complete search history.

(56) References Cited

U.S. PATENT DOCUMENTS
5,527,473 A * 6/1996 Ackerman .................... 210/767
(Continued)

FOREIGN PATENT DOCUMENTS
CN 1327874 A 12/2001
(Continued)

OTHER PUBLICATIONS

Machine translation of claims and specification for JP 05-068869 A (Yamashita et al.), Mar. 1993.*

*Primary Examiner* — Jennifer A Leung
(74) *Attorney, Agent, or Firm* — Scully, Scott, Murphy & Presser, P.C.

(57) ABSTRACT

The present invention relates to a slurry bed loop reactor comprising a riser and at least one downcomer (3), wherein two ends of the riser are connected to two ends of the downcomer (3) via lines (16) and (7), respectively. The riser comprises a reaction section (1) and a settling section (2) with an increased tube diameter disposed on the reaction section (1). A gas outlet (13) exists at the top of the settling section (2). Each of the downcomers (3) is divided into a filtrate section (5) and a slurry section (6) by filter medium (4), wherein the filtrate section (5) is connected to a liquid outlet (10); two ends of the slurry section (6) are respectively connected to two ends of the riser, and the filtrate region (5) may further be connected to a back purging system. When used in a gas-liquid-solid three phases reaction system, the reactor can realize successive separation of gas, liquid and solid particles in slurry, and realize the back purging regeneration of filter tubes without influencing the reaction processes. In addition, said reactor has the advantages of high separation efficiency, simple structure, flexible and easy operation.

9 Claims, 8 Drawing Sheets

U.S. PATENT DOCUMENTS

| | | |
|---|---|---|
| 6,068,760 A | 5/2000 | Benham et al. |
| 6,929,754 B2 * | 8/2005 | Espinoza et al. ............. 210/777 |
| 2002/0052423 A1 * | 5/2002 | Zhou et al. .................... 518/721 |
| 2005/0000861 A1 | 1/2005 | Clerici et al. |
| 2005/0027021 A1 | 2/2005 | Espinoza et al. |

FOREIGN PATENT DOCUMENTS

| | | |
|---|---|---|
| CN | 1433838 A | 8/2003 |
| CN | 1589957 A | 3/2005 |
| EP | 1 405 664 A1 | 4/2004 |
| JP | 05068869 A * | 3/1993 |
| JP | 2006-22044 A | 1/2006 |
| WO | WO 94/16807 | 8/1994 |
| WO | WO 02/097007 A2 | 12/2002 |
| WO | WO 2006/022736 A1 | 3/2006 |
| WO | WO 2006/040240 A1 | 4/2006 |

\* cited by examiner

SLURRY BED LOOP REACTOR AND USE THEREOF

CROSS REFERENCE TO RELATED APPLICATION

This application is a divisional of U.S. patent application Ser. No. 12/303,061, filed Mar. 9, 2009, now U.S. Pat. No. 7,919,536, which is a 371 filing of PCT/CN2007/001743 filed on May 31, 2007 which claims benefit of Chinese Patent Application No. 200610083439.0 filed May 31, 2006, the entire content and disclosure of which are incorporated herein by reference.

TECHNICAL FIELD

The present invention relates to an apparatus and process for separating solid particles from liquid, more specifically to an apparatus for continuously separating liquid from solid particles in a slurry bed loop reactor and a process for utilizing the same.

BACKGROUND OF THE INVENTION

A slurry bed reactor is a common gas-liquid (slurry) contact reaction equipment and has an extremely high liquid storage capacity. As for a catalytic reaction process having very great heat of reaction, the slurry bed reactor can effectively remove heat of reaction, achieve isothermal operation of the reactor, and guarantee the normal operation of the reactor. Hence, said reactor is widely used in the current chemical engineering industry. The slurry bed loop reactor, however, is a high effective, multiphase reactor developed on the basis the slurry bed bubbling reactor. Besides all the advantages of the slurry bed bubbling reactor, the slurry bed loop reactor further enables the inner fluid to circulate in a regular manner, so as to enhance the mixing, diffusion, heat transfer and mass transfer between the reactants.

In order to eliminate the diffusion effects, the catalyst in a size of scores of micrometers, or even in the form of finer particles is generally used in the slurry bed reactor, which is also accompanied by the difficult problem of the separation of the reaction product from the catalyst particles. How to effectively achieve the liquid-solid separation becomes the key technique during the use of the slurry bed reaction.

Generally, the liquid solid separation of the slurry bed reactor catalyst slurry is carried out outside the reactor. The catalyst-containing slurry must be delivered by a special pump, and the separated catalyst still needs to be sent back to the reactor in the slurry form. Such process, however, will readily lead to breakage of the catalyst particles, so as to bring problems to the continuous operation of the reactor for a long period of time.

U.S. Pat. No. 6,068,760 and WO02/097007A2 both disclose the process for the liquid solid separation in a slurry bed reactor by using the settling technique. Said process comprises drawing the reacted slurry out of the reactor, feeding the slurry through a settling pipe and into the settling tank for settlement, discharging the supernatant as the product and recycling the heavy slurry containing a large amount of catalyst particles at the subnatant layer back to the reactor.

The separation process disclosed in EP1405664A1 comprises directly introducing the reacted slurry into the settling tank with the baffle in a height higher than the liquid level in the settling tank, so that, after the slurry flows through the gaps between the baffle and the bottom of the tank, the supernatant slowly rises and outflows from the upper part of the settling tank, and the heavy slurry containing particles is fed back to the main body of the reactor from the outlet at the bottom of the settling tank.

CN1433838A discloses the method for setting up separation units in the main body of the reactor so as to enable the slurry to achieve the liquid solid separation. Moreover, said document discloses applying a strong magnetic field at the bottom of the settling unit to speed up the liquid solid separation rate. However, the complete liquid solid separation achieved by a single settling technique to obtain the liquid product having an extremely low solid content requires a settling device having a very great volume to ensure sufficient settling time, which results in that most of the area and space of the equipment are occupied by the settling device and leads to relatively low production efficiency. The smaller the size of the catalyst is, the more favorable it is to the reaction. Meanwhile, solid powder having an extremely particle size will be produced during the reaction due to catalyst abrasion. The effect of the settling technique for the catalyst particles in a size of several micrometers, or even in a smaller size, however, is not good. Since the Fischer-Tropsh Synthesis reactor has a relatively great diameter, the magnetic field device is difficult to produce homogeneous magnetic field in the reactor. Moreover, the reactor is cumbersome and expensive, and cannot degauss the magnetized catalyst to prevent the magnetized catalyst from agglomeration, which all affect the normal operation of the reactor.

WO94/16807 discloses the process for achieving the liquid solid separation using filtration pack in the reactor. However, the regeneration of the filtration pack is difficult once the filtration pack is blocked up by the catalyst particles. Thus the process is not suitable for large-scale continuous production.

CN1589957A discloses the process for achieving the liquid solid separation by disposing the primary separation unit inside the reactor and the secondary separation unit outside the reactor. In addition, the back purging unit is disposed outside the reactor to carry out the continuous operation of filtration. This not only occupies the reaction space inside the reactor, but also results in complex equipment structure and complicated operation.

US2005/0027021A1 discloses a liquid solid separation system. Said system achieves the liquid solid separation by setting up the vertical filtering units outside the reactor. The filter cake deposited on the filtering units performs a primary filtration function, and the thickness of the filter cake is adjusted by adjusting the flow velocity of the slurry. However, since the space of the units has been designed and determined, the range to be adjusted by controlling the filtering rate purely by adjusting the flow velocity of the slurry outside the units is greatly limited. Furthermore, fine particles easily block up the filtration medium, and there is no effective back purging method, which results in that the continuation of the filtration is difficult to achieve.

US2005/0000861A1 discloses a filtering unit capable of being disposed inside and/or outside the reactor. Said unit comprises a rough filtration section and a fine filtration section coaxially and vertically disposed in the same diameter. The upper rough filtration section prevents the catalyst having large particles from entering the filtration section and recycles back to the reactor. The filtrate through rough filtration will be directly fed to the fine filtration section below the rough filtration section for further filtration and separation. Such liquid solid separation process recurs to the external force. However, no detailed back purging method is provided. Thus the continuous effective liquid solid separation is difficult to fulfill.

From the analyses above, it can be seen that it requires greater area, even valuable reaction space, to purely use the settling process. The continuous operation cannot be achieved by using the filtering method. Even if the continuous operation is achieved, the separation efficiency will be lowered due to higher solid content. Moreover, the equipment will be rendered complex, and the investment and operation cost will be increased.

CONTENTS OF THE INVENTION

The object of the present invention is to provide a slurry bed loop reactor for conveniently and effectively achieving the continuous separation of the gas-liquid-solid three phases.

Another object of the present invention is to provide a process for the continuous separation of the gas-liquid-solid three phases in the slurry bed reactor, so that the reaction liquid product can be continuously discharged.

The third object of the present invention is to provide a process for utilizing the slurry bed reactor to produce liquid hydrocarbons or paraffin waxes by the Fischer-Tropsh synthesis.

The slurry bed loop reactor provided in the present invention comprises a slurry bed loop reactor comprising a riser and at least one downcomer (3), wherein two ends of the riser are connected to two ends of the downcomer (3) respectively via lines (16) and (7); the riser comprises a reaction section (1) and a settling section (2) with an increased tube diameter disposed on the reaction section (1); a gas outlet (13) exists at the top of the settling section (2); each of the downcomers (3) is divided into a filtrate section (5) and a slurry section (6) by filter medium (4), wherein the filtrate section (5) is connected to a liquid outlet (10), and two ends of the slurry section (6) are respectively connected to two ends of the riser (1).

In the reactor provided in the present invention, the tube diameter of the settling section (2) is increased so as to decrease the flow velocity of the slurry flowed from the reaction section (1). In the settling section (2), coarse particles turn back to the reaction section (1) due to gravity settling, and gas bubbles carried by the slurry are effectively eliminated. After the gas liquid (slurry) separation, gas is discharged from the reactor via gas outlet (13) at the top of the settling section (2). The tube diameter ratio of the settling section (2) to the reaction section (1) at the lower part of the riser (1) to the settling section (2) ranges from 1:1.1 to 1:10.0, preferably from 1:1.2 to 1:3.0.

In the reactor provided in the present invention, the lower end of the filtrate section (5) in the downcomer (3) is communicated with the liquid outlet (10) which may be connected with the back purging system for purging the filtering units via valve (9). Meanwhile, a solid catalysts discharge outlet (11) and a solid catalysts feed inlet (12) are disposed on line (7), which connects the lower end of the downcomer (3) to the lower end of the riser.

According to one aspect of the present invention, the settling section (2) in the reactor of the present invention has a baffle (or baffles) disposed approximately in the vertical direction, wherein the distance between the upper edge of said baffle(s) and the top of the settling section is 1/10-9/10 of the total height of the settling section; the section above the upper edge of the baffle(s) in the settling section is the gas-liquid separation section, and the section below the upper edge of the settling section is divided into turbulence section (20) and steady flow section (19) by said baffle(s), wherein said turbulence section (20) is adjacent to and directly communicated to the reaction section (1), and the bottom of said steady flow section (19) is in liquid communication to the reaction section (1) via hole(s) (18) or fluid guide pipe(s) (17); the downcomer is connected via line (16) to the riser at the upper part of the steady flow section, and the position at which the line (16) is connected to the steady flow section ranges from 1/10 to 9/10, preferably from 1/3 to 2/3 of the vertical distance between the upper edge of said baffle(s) and the position at which hole(s) (18) or fluid guide pipe(s) (17) is connected to the baffle(s). Said baffle(s) may be in a shape of flat plate, circular arc, cylinder, truncated cone and funnel, or other suitable shapes, or the combination of the shapes above. The expression "disposed approximately in the vertical direction" means that at least a part of said baffle(s) are tangential to the vertical plane, and a part of the settling section is divided by said baffle(s) into two or more sections substantially in a horizontal distribution.

A preferably setting manner of said baffle(s) in said reactor is as follows. In the reactor, said turbulence section is separated from the steady flow section by cylindrical baffle(s), and the bottom of the baffle(s) is fixed on the inner wall of said riser. The turbulence section (20) is disposed inside the cylinder, and the steady flow section (19) surrounds the turbulence section (20), i.e. the loop section between said cylinder and the outer wall of the settling section (2). The bottom of said steady flow section (19) is communicated to the lower part of the reaction section (1) via fluid guide pipe(s) (17). The diameter of the bottom of the cylindrical baffle(s) may be the same as or different from those of other parts of said baffle(s). That is to say, said "cylindrical" shape includes not only the standard cylinder shape, but also the truncated cone shape, other similar shapes, or the combination of said shapes.

Another preferably setting manner of said baffle(s) in said reactor is as follows. In the reactor, said turbulence section (20) is separated from the steady flow section (19) by cone-shaped cylindrical baffle(s) which are fixed onto the inner wall of the riser via support (21). The steady flow section (19) is disposed inside the cone-shaped cylindrical baffle(s), and the turbulence section (20) surrounds the steady flow section (19), i.e. the loop section surrounded by said cone-shaped cylinder and the outer wall of the settling section (2). The steady flow section (19) is connected to the lower part of the reaction section (1) via fluid guide pipe(s) (17) at the bottom of the cone-shaped cylinder. Said "cone-shaped cylinder" represents the shape generally deemed to be a cone with the downward vertex, i.e. the shape formed by combining the "funnel shape" with the "cylindrical" shape as defined above, wherein the upper edge of said cone is combined with the lower edge of said cylindrical portion. Certainly, said "cone-shaped cylindrical shape" also includes the pure "funnel shape". The "support" herein represents a device capable of physically fixing said baffle(s) with the inner wall of the riser, wherein sufficient gaps are left between said baffle(s) and said inner wall so that the fluid passes freely.

In the reactor provided in the present invention, the slurry from the reaction section goes through the turbulence section (20) and into the settling section (2). Then, the gas liquid (slurry) separation is carried out herein, and the gas is discharged from the reactor via the discharge outlet (13) at the top thereof. In the turbulence section (20), coarse particles directly turn back to the reaction section (1) due to gravity settling, or flow into the steady flow section (19) along with the slurry and then settle down at the bottom of the steady flow section (19) by means of gravity settling. The slurry containing more particles then go back to the reaction section via hole(s) (18) on the tube wall or via fluid guide pipe(s) (17), preferably to the lower part of the reaction section via fluid guide pipe(s). Typically, the slurry carrying a great amount of bubbles rises from the reaction section to the turbulence section at the top thereof during the normal operation, and the liquid level thereof is substantially on the same level as the upper edge of the baffle(s). On the other side of the baffle(s), the liquid level of the steady flow section is on the same level as or slightly lower than the upper edge of the baffle(s). When the slurry overflows the turbulence section to the steady flow section, most of the bubbles tend to be gentle due to flowing, break away from the slurry and enter the gas liquid separation section at the top thereof. The enlargement of the space of the gas liquid separation section lowers the gas speed and decreases the droplets carried by the gas. Since the flow velocity of the slurry in the steady flow section becomes slow, solid particles therein settle down to the bottom of the steady flow section. The solid particle enriched slurry will turn back to the reaction section from the bottom of the steady flow section (19) via hole(s) (18) or via fluid guide pipe(s) (17) for further reaction. Then the slurry excluding bubbles and larger solid particles will enter the filter portion via the line (16) for solid liquid separation.

In the reactor provided in the present invention, the settling section (2) of the riser and the downcomer (3) compose the separation section of the reactor, wherein the reactor comprises at least one downcomer (3). When there are many downcomers (3), at least one downcomer (3) of the downcomers is in the operating state by switching.

Figure 1:
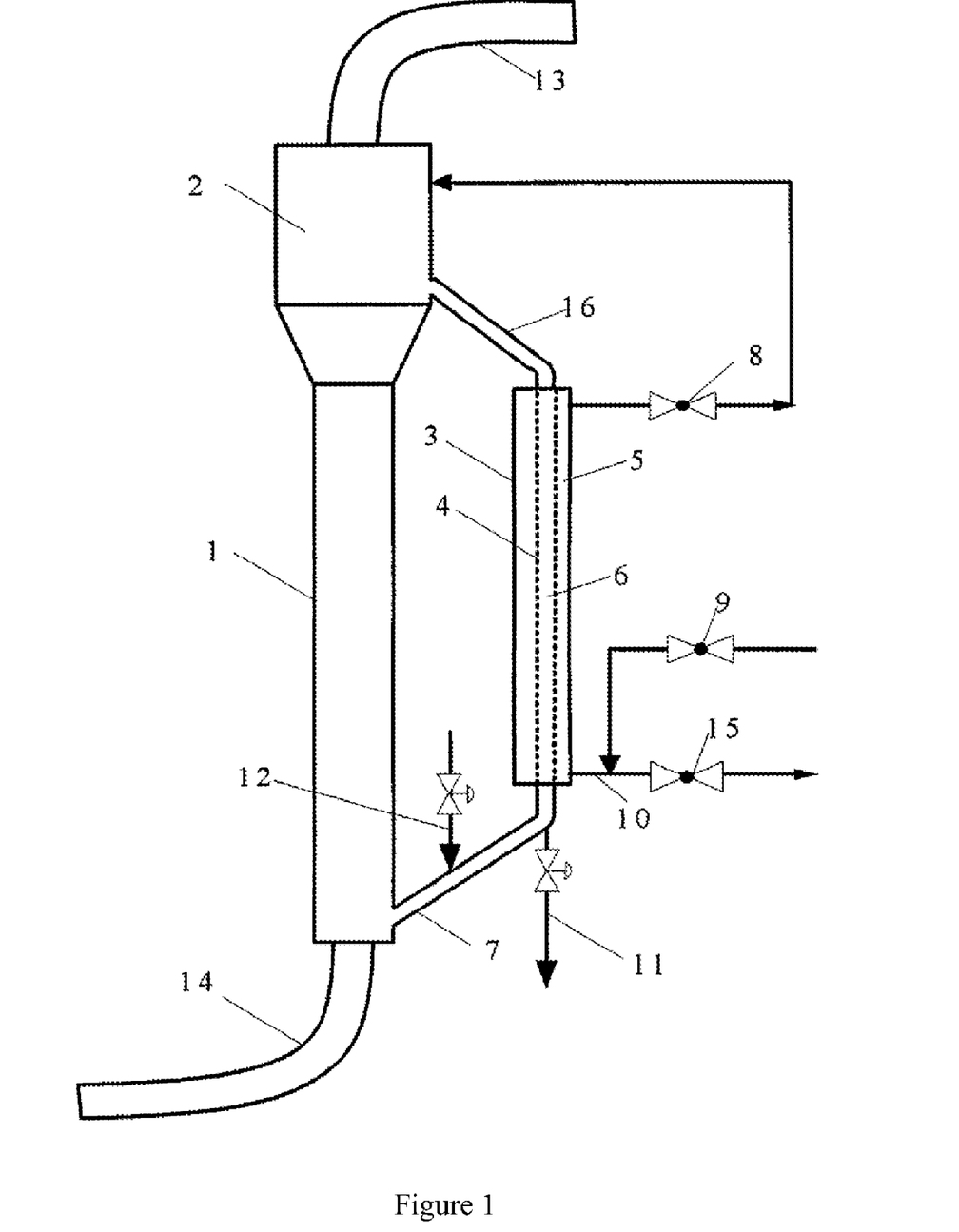
Figure 2:
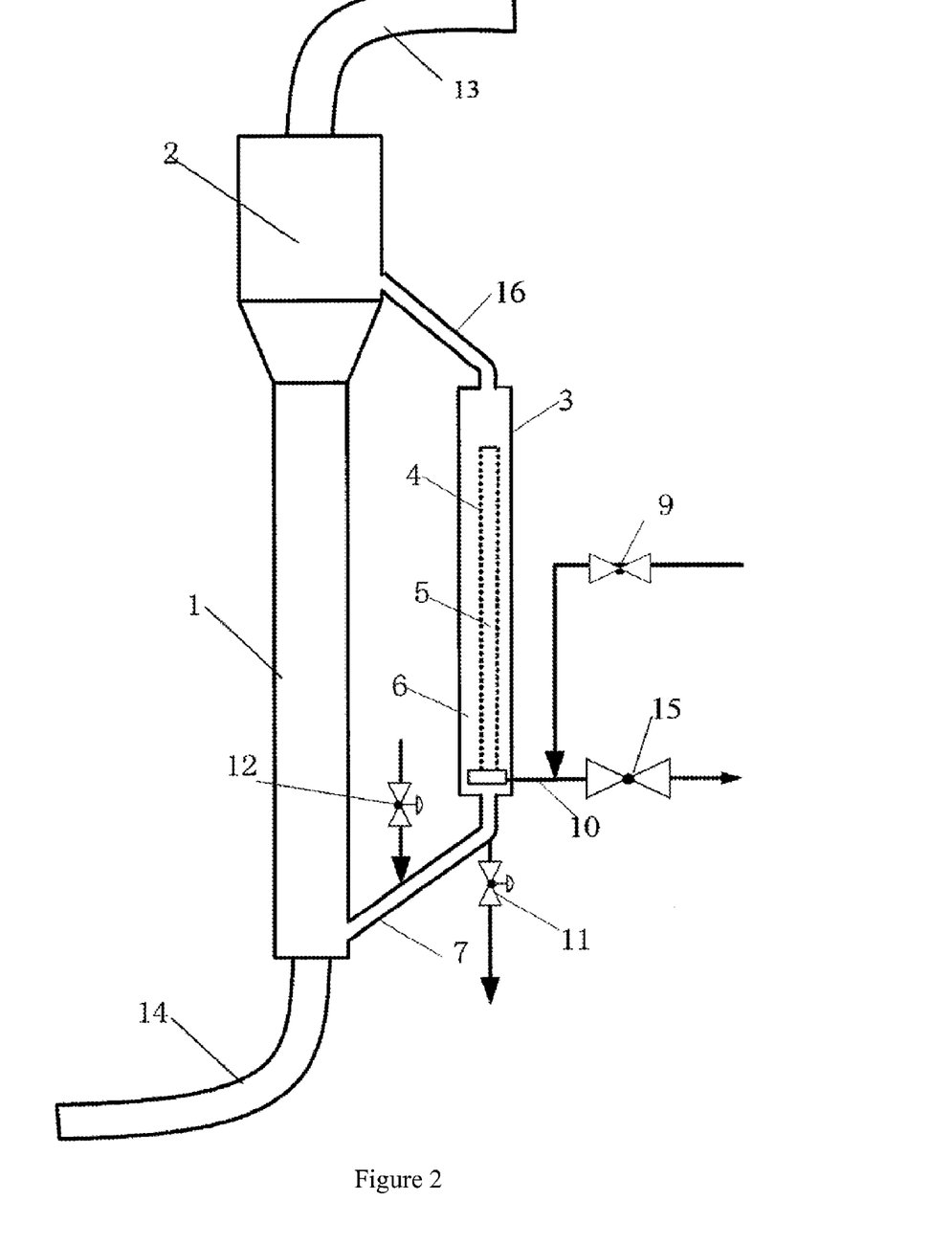

In the reactor provided in the present invention, the filter medium may be in the form of the inner filter tube. When it is in the form of the inner filter tube, the settling section (2) may be connected via line (16) with the downcomers (3) in the form of connecting with the inner filter tube (as shown in FIG. 1), or with the outer tube of the downcomer (3) (as shown in FIG. 2). When the settling section (2) is connected with the inner filter tube, the outer tube is connected with the liquid discharge outlet (10). In the downcomers (3), the liquid radially goes through the wall of the inner filter tube from inside to outside, and is drawn out via lines as the product. Optionally, the upper part of the outer tube is connected via line (8) with the gas enriched section at the top of the settling section (2), so as to maintain the pressure balance and prevent the gas from agglomeration in the downcomers. When the riser is connected with the outer tube of the downcomer (3), the filter tube is connected with the liquid discharge outlet (10). Meanwhile, the upper part of the outer tube is connected with the gas enriched section at the top of the settling section (2) via line (8), so as to discharge the gas and bubbles carried into the downcomers. In the downcomers (3), the liquid radially goes through the wall of the inner filter tube from outside to inside, and is drawn out via lines as the product.

Figure 4:
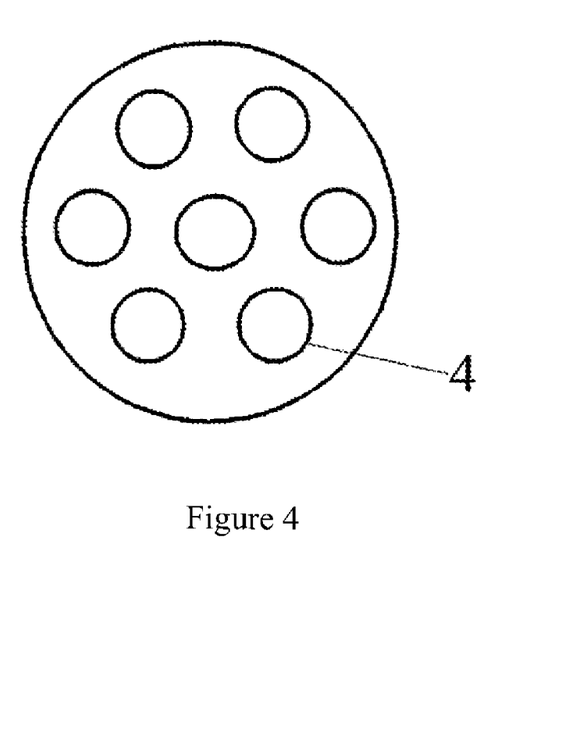
FIG. 4 shows the top view of many inner tubes connected in parallel as the filtering unit by using catch tray.
Figure 5:
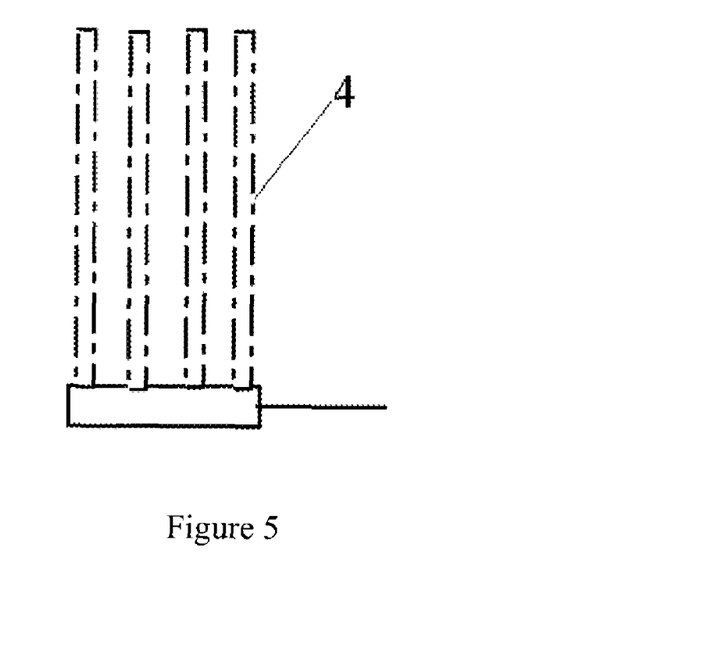
FIG. 5 shows the side view of many inner tubes connected in parallel as the filtering unit by using catch tray.

At least one filter tube is comprised inside the outer tube of each downcomer (3). When more filter tubes are comprised inside one downcomer (3), at least two filter tubes may be connected in parallel on a catch tray to form a filtering unit as shown in FIGS. 4 and 5. FIG. 4 shows the top view of many filter tubes connected in parallel as the filtering unit by using catch tray, and FIG. 5 shows the side view of many filter tubes connected in parallel as the filtering unit by using catch tray. Moreover, many filtering units can be combined together. The filtering unit and the combination of the filtering units can effectively save the space and increase the filtering efficiency.

Figure 6:
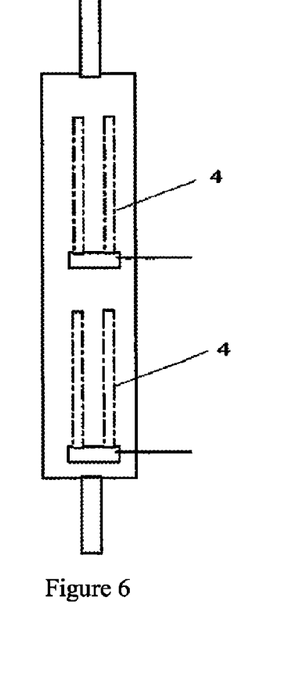
FIG. 6 shows the schematic diagram of many filtering units axially disposed along the downcomer.
Figure 7:
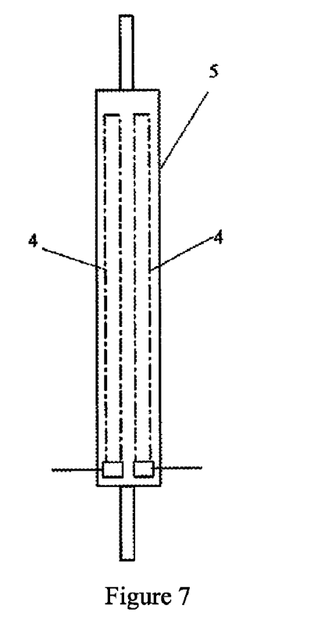
FIG. 7 shows the schematic diagram of many filtering units radially disposed along the downcomer.
Figure 8:
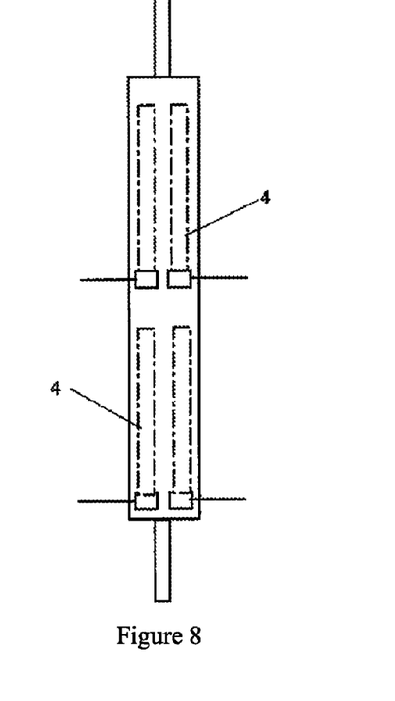
FIG. 8 shows the schematic diagram of many filtering units axially and radially disposed along the downcomer.

When the combination of several filtering units is used, there are the following forms for the combination and distribution of the filtering units in the outer tube, including many filtering units axially disposed along the downcomer (see FIG. 6), many filtering units radially disposed along the downcomer (see FIG. 7), and many groups of filtering units axially disposed and radially distributed in parallel (see FIG. 8). An independent backpurging system may be disposed for each of the filtering units, or the filtering units may be connected together via lines to share a set of the backpurging system.

In the reactor provided in the present invention, said solid catalysts discharge outlet (11) and solid catalysts feed inlet (12) are used for processing the catalyst more conveniently. When the catalyst particles in the reactor need to be replaced because of inactivation or attenuation due to abrasion, the catalyst particles can be discharged from the discharge outlet (11), and fresh catalyst can be supplemented via the feed inlet (12).

In the reactor provided in the present invention, there are no limits for the material of the filter medium (4). The filter medium (4) may be selected from the group consisting of sintered metal silk screen microporous filtering material, sintered metal powder microporous filtering material, metal microporous membrane material, sintered metal fiber microporous material, microporous ceramic material, ceramic membrane material or other types of filtering materials. The range of the pore diameter range of the filter medium may vary according to the type of the catalyst particles specifically used, the scale of the reactor, and the reaction type. For example, it may fall within the filtering scope, such as microfiltration, ultrafiltration, nanofiltration and the like.

The process for utilizing the reactor provided in the present invention is characterized in that the raw material is fed into the reactor via the feed inlet (14) and mixed with the slurry in the reaction section (1) of the riser; the mixed slurry reacts in the reaction section (1) and flows upwardly to the settling section (2) via the upper pipe end of the reaction section (1), and gas liquid separation is conducted in the settling section (2), wherein the gas is discharged from the discharge outlet (13) at the top of the settling section (2); coarse particles turn back to the reaction section (1) due to gravity settling; and the slurry containing fine particles enter the downcomer (3) from the settling section (2) via line (16); the main body of the slurry flows downwardly and axially in the settling section (2), wherein a part of the liquid is driven by differential pressure between both sides of filter medium (4) to go through the filter medium (4) and into the filtrate section (5), and is finally drawn out as the product. The solid particles continue to flow downwardly with the main body of the slurry and go back to the reaction section (1) of the riser via line (7) for further reaction.

Under the circumstance that the baffle(s) are set up in the settling section, the reactor is utilized as follows. The raw material is fed into the reactor via the feed inlet (14), and mixed with the slurry in the reaction section (1) of the riser. The mixed slurry reacts in the reaction section (1), flows upwardly to the turbulence section (20) of the settling section (2) from the upper pipe end of the reaction section (1), and then overflows the upper edge of the baffle(s) to the steady flow section (19) from the turbulence section (20); gas liquid separation is conducted in the turbulence section, steady flow section and gas liquid separation section, wherein the gas is discharged from the discharge outlet (13) at the top of the settling section (2); coarse particles turn back directly to the reaction section (1) from the turbulence section (20) due to gravity settling, or settle to the bottom of the steady flow section (19) and then go back to the reaction section (1) via hole(s) (18) or to the lower part of the reaction section (1) via fluid guide pipe(s) (17); the slurry containing fine particles enter the downcomer (3) from the steady flow section (19) via line (16); the main body of the slurry flows downwardly and axially in the slurry section (6), wherein a part of the liquid is driven by differential pressure between both sides of filter medium (4) to go through filter medium (4) and into filtrate section (5), and is finally drawn out as the product. The solid particles continue to flow downwardly with the main body of the slurry and go back to the reaction section (1) of the riser via line (7) for further reaction.

In the process provided in the present invention, the superficial gas velocity of the gas entering the reactor in the reaction section (1) ranges from 0.01 to 1.0 m/s, preferably from 0.04 to 0.5 m/s, wherein the superficial gas velocity represents the empty tube gas velocity of the gas flow in the reaction section (1) of the riser. To control the gas velocity within such range can enable the slurry to be homogeneously stirred and mixed, to provide the driving force to drive the slurry to recycle between the riser and the downcomer (3), and to maintain the reaction pressure in the reactor. The relatively higher pressure inside the reactor and relatively lower pressure in the filtrate section (5) of the downcomer (3) form a differential pressure between two sides of the filter medium (4), which drives the slurry, from which the gas is separated, through the filter medium (4), so as to achieve the solid liquid separation. According to the reactor and the application method thereof provided in the present invention, the circulation of the slurry in the whole reactor composed of the riser and the downcomer portions can be achieved, and the effective gas/liquid/solid separation can be completed. Moreover, no additional external force is added in the downcomer portion.

Any suitable back purging process in the prior art can be used in the present invention. The typical process is as follows. Along with the continuous increase of the thickness of the filter cake, the differential pressure between two sides of the filter medium (4) increases during the reaction. When the differential pressure is higher than the first set value, the backpurge system starts to operate, and the filtrate section (5) is switched to connect with the backpurge pipe so as to enable the backpurge medium to rinse the filter medium (4) from the filtrate section to the slurry section driven by the external reverse differential pressure. Along with the removal of the filter cake, the reverse differential pressure continues to decrease. When the differential pressure is lower than the second set value, the rinsing process comes to an end. At this time, the filtrate section is disconnected with the backpurge pipe, and the system turns back to the normal operating state. The backpurge medium may be gas or liquid, preferably the product supernatant or the reaction exhaust gas, more preferably the product supernatant. The first set value of the differential pressure for initiating the backpurging system ranges from 0.1 to 1.0 MPa, and the second set value of the differential pressure for closing the backpurging system ranges from 0.05 to 0.8 MPa. Different filtering materials have different filtering differential pressure ranges, and different materials correspond to different backpurging pressures. For the same filtering element and device, the first set value is necessarily higher than the second set value. For the filtering process of the normal operation, the differential pressure between two sides ranges from 0.05 to 1.0 MPa. The backpurging process can be initiated and ended automatically or manually.

Under the circumstance of not affecting the reaction process, fine catalyst particles can be selectively removed via the solid catalysts discharge outlet (11), and a part of the fresh catalyst can be supplemented via the solid catalysts feed inlet (12).

The process provided in the present invention can be used for the production of liquid hydrocarbons or paraffin waxes by Fischer-Tropsh Synthesis, wherein the raw material is synthetic gas; the active components of the catalyst contains Fe and/or Co; the operating conditions in the reaction section (1) of the riser include a temperature of 300-300° C., preferably 230-280° C. a pressure of 1.0-5.5 MPa, preferably 1.7-3.5 MPa, and a raw material space velocity of 1.0-8.0 $NLg^{-1} h^{-1}$, preferably 2.0-4.0 $NLg^{-1} h^{-1}$ over the mass of the catalyst.

The slurry bed loop reactor provided in the present invention can fulfill the continuous, high efficient separation of solid catalyst particles, liquid products and reaction gases, and achieve the continuous discharge of the gas liquid solid three phases. Firstly, the circulation flow of the fluid inside the loop reactor achieves the continuous replacement of the concentrated slurry in the downcomers. Thus said reactor has a higher efficiency than the reactor using other separation means. Secondly, the relative high pressure inside the reactor forms a pressure drop between the slurry section and the filtrate section in the downcomers, which drives the slurry through the filter medium and achieves the solid liquid separation without any external driving force. In addition, the backpurging system is set up and can be flexibly operated, so that the filter medium is easily regenerated and the continuous operation of the whole reactor is ensured. The system can further be used to conveniently and flexibly remove the inactivated catalyst and to supplement the catalyst having high activity. To divide the settling section into the turbulence section and the steady flow section for quasi-static settling decreases the disturbance of the settled particles in the settling section from the ascending gas flow in the reaction section, increases the separation efficiency of the settling section and decreases the filtering load of the downcomers, so as to increase the handling capacity and separation efficiency of the whole reactor and prolong the backpurging period. The reactor and the application method thereof in the present invention are suitable for the chemical reaction process of the gas liquid solid three-phase reaction, wherein the liquid product needs to be separated from the slurry, e.g. hydrogenation and dehydrogenation of hydrocarbon oils using suspension bed or slurry bed reactor, and Fischer-Tropsh Synthesis.

BRIEF DESCRIPTION OF THE DRAWINGS

FIG. 1 and FIG. 2 show the schematic diagram of the slurry bed loop reactor having a single downcomer, wherein FIG. 1 shows the mode by which the slurry goes through the wall of the filter tube from inside to outside, and FIG. 2 shows the mode by which the slurry goes through the wall of the filter tube from outside to inside.

MODE OF CARRYING OUT THE INVENTION

The use of the slurry bed loop reactor of the present application in the process for continuous separating liquid from solid particles in the Fischer-Tropsh Synthesis is specifically stated as follows by combining with the drawings, but the present application will not be limited accordingly.

As shown in FIG. 1, the riser (1) of the loop reactor is the slurry bed reaction section. The reactant-synthetic gas is fed into the reactor from the lower part of the riser (1), mixed with the slurry therein and contacted with the catalyst particles in the slurry, and finishes the chemical reaction during the rising process. The product and the remnant reactant rise to the upper settling section (2) of the reactor along with the catalyst. Since the sectional area of the settling section (2) is greater than that of the reaction section, the flow velocity of the slurry is decreased. Larger catalyst particles turn back to the reaction section by means of gravity settling. The unreacted gas reactant is separated from the product slurry and discharged from the outlet (13) at the top thereof. The catalyst in the form of fine particles enters the downcomer (3) via line (16). In the downcomer (3), the liquid flows downwardly in the filter tube, and radially goes through the tube wall into the outer tube driven by the inner and outer differential pressure, and finally is drawn out as the product.

Solid particles are blocked up on the inner wall of the filter tube. Due to the flushing action from the fluid flow, a part of the filter cake on the inner wall of the filter tube continuously fall off and flow downwardly along the slurry to the riser (1), and a part of the filter cake which does not easily fall off stays on the inner wall of the filter tube. Along with the continuous increase of the thickness of the filter cake, the differential pressure between the inner and outer tubes increases. When the differential pressure is higher than 0.5 MPa, the back purging system goes into operation. At this time, the valve (15) subsequent to the liquid outlet (10) closes, and the valve (9) opens. Driven by the additional reverse differential pressure, the back purging medium is introduced to the outer tube (5) and through the filter tube radially from outside to inside. The filter cake adhered to the inner wall of the filter tube is back-purged to the slurry and flows downwardly along with the slurry back to the riser. When the differential pressure is lower than 0.1 MPa, the purging process finishes. At this time, the valve (9) on the tube through which the back purging medium is introduced closes, and the valve (15) subsequent to the liquid discharge outlet and the valve (8) on the communicating tube open, and the system turns back to the normal operation.

Figure 3:
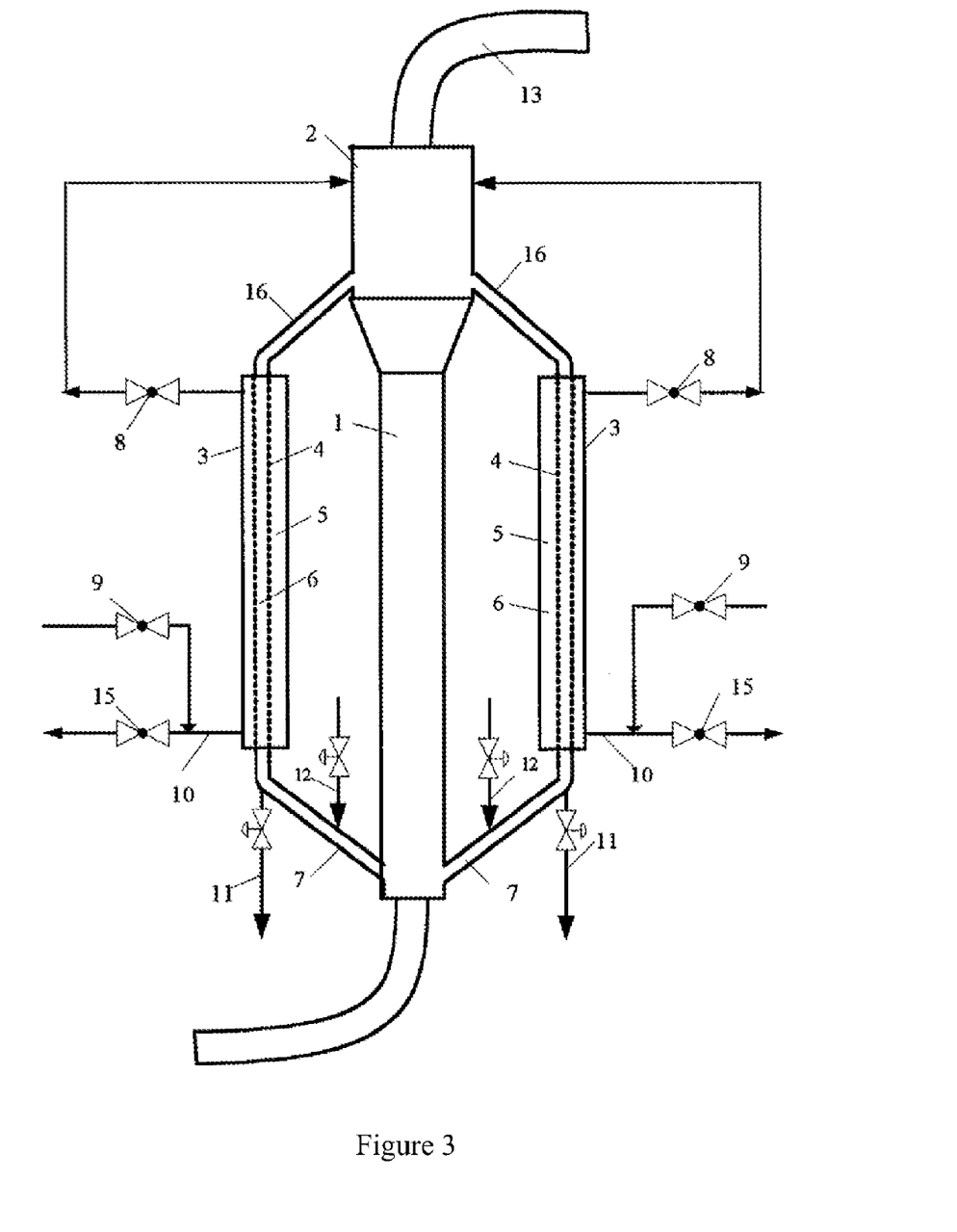
FIG. 3 shows the schematic diagram of the slurry bed loop reactor having two downcomers.

The slurry bed loop reactor having two downcomers can be found in FIG. 3. During the application, two downcomers can be utilized simultaneously or alternatively. Likewise, the back purging process of two downcomers can be carried out simultaneously or alternatively. In general, the back purging process is preferably carried out alternatively and independently, so as to ensure the continuity of the operation.

The following examples are used to further explain the process provided in the present invention, but do not limit the scope of the present invention.

Example 1

The reactor as shown in FIG. 1 is used. The riser settling section (2) and the reaction section (1) in the slurry bed loop reactor have a tube diameter ratio of 1.5:1. The filter tube used in the downcomers is the sintered metal porous filter tube having an outer diameter of 50 mm, a length of 1,000 mm and an average pore diameter of 1 µm. The particle size of the catalyst used therein ranges from 1 to 100 µm. During such process, the synthetic gas enters the bed layer in a bubbling form from the bottom of the riser, and forms the liquid hydrocarbons under the operating conditions. After the slurry rises to the settling section, the unreacted synthetic gas and the gas product are completely separated from the slurry, and discharged from the outlet. Coarse catalyst particles (about 80% of the total amount of the catalyst) in the slurry settle down in the settling section and return to the riser. The slurry enters the filter tube of the downcomer, and the liquid product enters the outer tube through the wall of the filter tube and is finally drawn out. Due to the flushing action from the fluid flow, a part of the filter cake on the inner wall of the filter tube continuously fall off and flow downwardly along with the liquid to the riser (1), and a part of the filter cake which does not easily fall off stays on the inner wall of the filter tube. Along with the continuous increase of the thickness of the filter cake so that the differential pressure between the inner and outer tubes is higher than 0.5 MPa, the valve (15) subsequent to the liquid outlet (10) and the valve (8) on the communicating tube close, and the valve (9) opens. The product supernatant is introduced to the outer tube with a pump, and into the inner tube through the wall of the filter tube. The filter cake is purged to the slurry and flows downwardly along with the slurry to the riser. This process lasts several seconds. When the differential pressure between the inner and outer tubes is lower than 0.1 MPa, the back purging system is disconnected with the liquid discharge outlet (10); the valves (15) and (8) open, and the system turns back to the normal operation. During such process, the solid particle content in the liquid product is lower than 5 µg/ml, and the maximum diameter of the particles is 2 µm. The separation efficiency is more than 99%, wherein the separation efficiency is calculated by using the following formula:

$$\eta = (S_m - S_f)/S_m$$

wherein $S_m$=solid content in the raw material (slurry before filtration); $S_f$=solid content in the product (supernatant drawn out from the filtrate section).

Example 2

The slurry bed loop reactor as shown in FIG. 1 is used. The riser settling section and the reaction section in the reactor have a tube diameter ratio of 1.5:1. The filter tube used in the downcomers is the sintered metal porous filter tube having an outer diameter of 50 mm, a length of 1,000 mm and an average pore diameter of 1 µm. The particle size of the catalyst used therein ranges from 1 to 100 µm. The raw material is the synthetic gas. When the differential pressure between the inner and outer tubes of the downcomer is higher than 0.5 MPa, the back purging system goes into operation. The product supernatant is introduced to the outer tube with a pump, and into the inner tube through the wall of the filter tube. The filter cake is purged to the slurry and flows downwardly along with the slurry to the riser. This process lasts several seconds. When the differential pressure between the inner and outer tubes is lower than 0.1 MPa, the back purging system closes, and the slurry bed reactor turns back to the normal operation. During such process, the flow capacity of the supernatant drawn out from line (10) is 60 L/h; the back purging period is 48 h; the solid particle content in the liquid product is lower than 5 μg/ml; and the maximum diameter of the particles is 2 μm. The separation efficiency is more than 99%.

Examples 3-5 show the separation effect of the loop reactor in which the settling section (2) have baffle dividing the settling section into the turbulence section, steady flow section and gas liquid separation section.

Example 3

Figure 9:
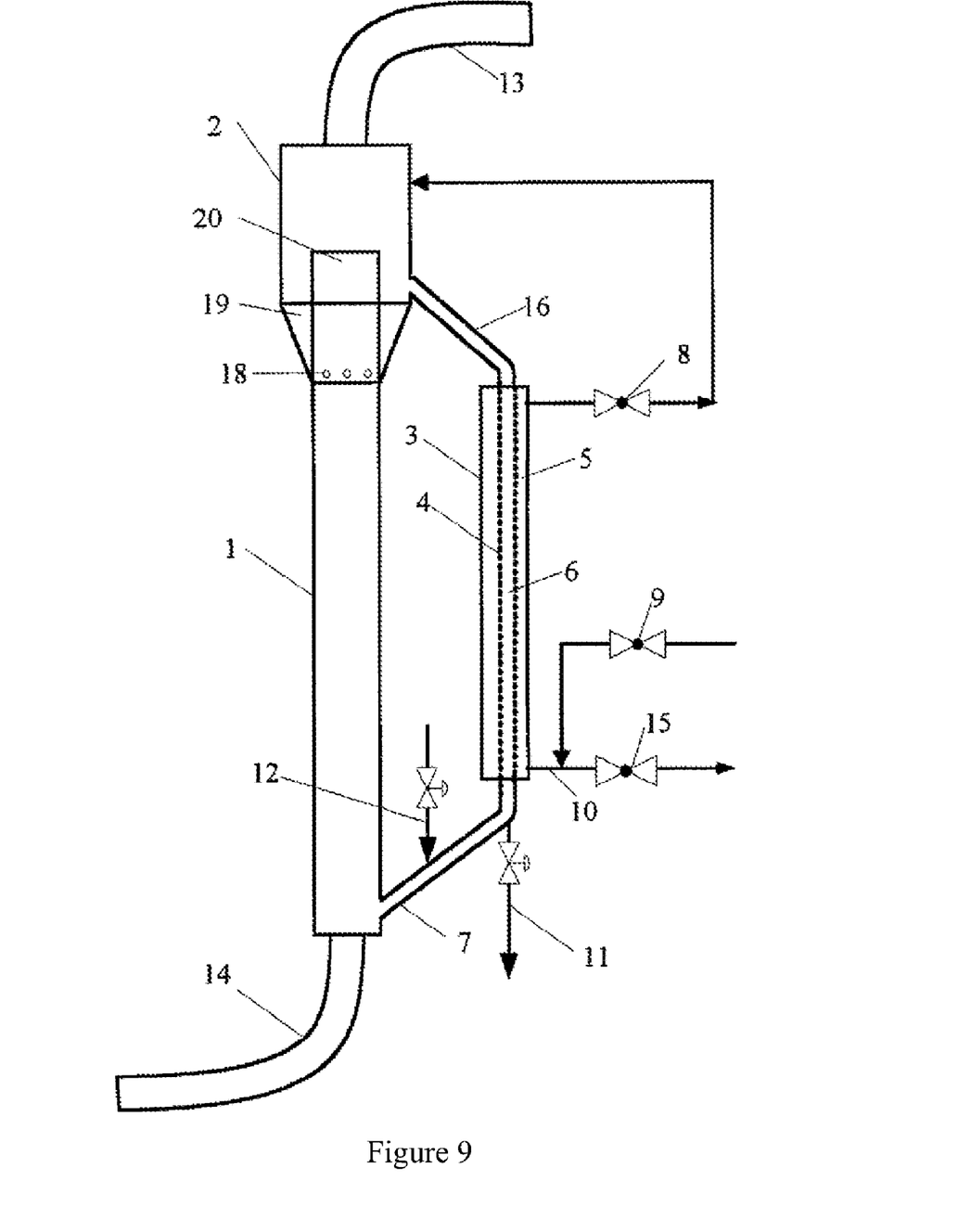
FIG. 9 shows the schematic diagram of the reactor in which the bottom of said steady flow section is connected to the reaction section via the hole(s) at the lower part of the cylindrical baffle(s).

The reactor as shown in FIG. 9 is used. Said turbulence section (20) is separated from the steady flow section (19) by said cylindrical baffle, and the bottom of said steady flow section (19) is connected to the reaction section via the hole(s) at the bottom of the baffle. The reaction section has a size of Ø70×3200 mm. The expanding section of the settling section has a tube diameter of 150 mm and a height of 1000 mm The cylindrical baffle have a size of Ø70×700 mm, and 6 holes in a size of Ø12 at the bottom thereof. The outer tube of the downcomers has a size of Ø70×2000 mm, and the inner filter tube is made of metal microporous membrane and has a size of Ø30×1800 mm and an average pore diameter of 1.0 μm.

The catalyst comprises 20.3% by weight of $Co_2O_3$, 76.1% by weight of $SiO_2$, and 3.6% by weight of MgO. It is prepared by impregnating $SiO_2$ microspheric carriers with a solution containing $Co(NO_3)_3$ and $Mg(NO_3)_2$, then standing for 24 h, drying at 120° C., calcining at 400° C. for 6 h to obtain the catalyst having a particle size ranging from 1 to 100 μm.

The loadage of the catalyst is 15% (by volume). The raw material is the synthetic gas (the molar ratio of $H_2$:CO is 2:1), and the space velocity thereof over the catalyst mass is 2.0 $NLg^{-1} h^{-1}$. Said raw material is in contact and react with the catalyst under the conditions of a pressure of 3.0 MPa and a temperature of 200-220° C. When the differential pressure between the inner and outer tubes of the downcomer is higher than 0.5 MPa, the back purging system goes into operation. The product supernatant is introduced to the outer tube with a pump, and into the inner tube through the wall of the filter tube. The filter cake is purged to the slurry and flows downwardly along with the slurry to the riser. This process lasts several seconds. When the differential pressure between the inner and outer tubes is lower than 0.1 MPa, the back purging system closes, and the slurry bed reactor turns back to the normal operation. After fractionation of the supernatant, the product contains 6.3% by weight of dry gas, 3.6% by weight of liquefied gas, 13.4% by weight of naphtha, 30.7% by weight of diesel oil and 46% by weight of hard wax.

During such process, the flow capacity of the supernatant drawn out from line (10) is 1.7 L/h; the back purging period is 120 h; and the single pass conversion of CO in the synthetic gas is 92.4%. In addition, the solid particle content in the liquid product is lower than 3 μg/ml, and the maximum diameter of the particles is 1 μm. The separation efficiency is 99.5%.

Example 4

Figure 10:
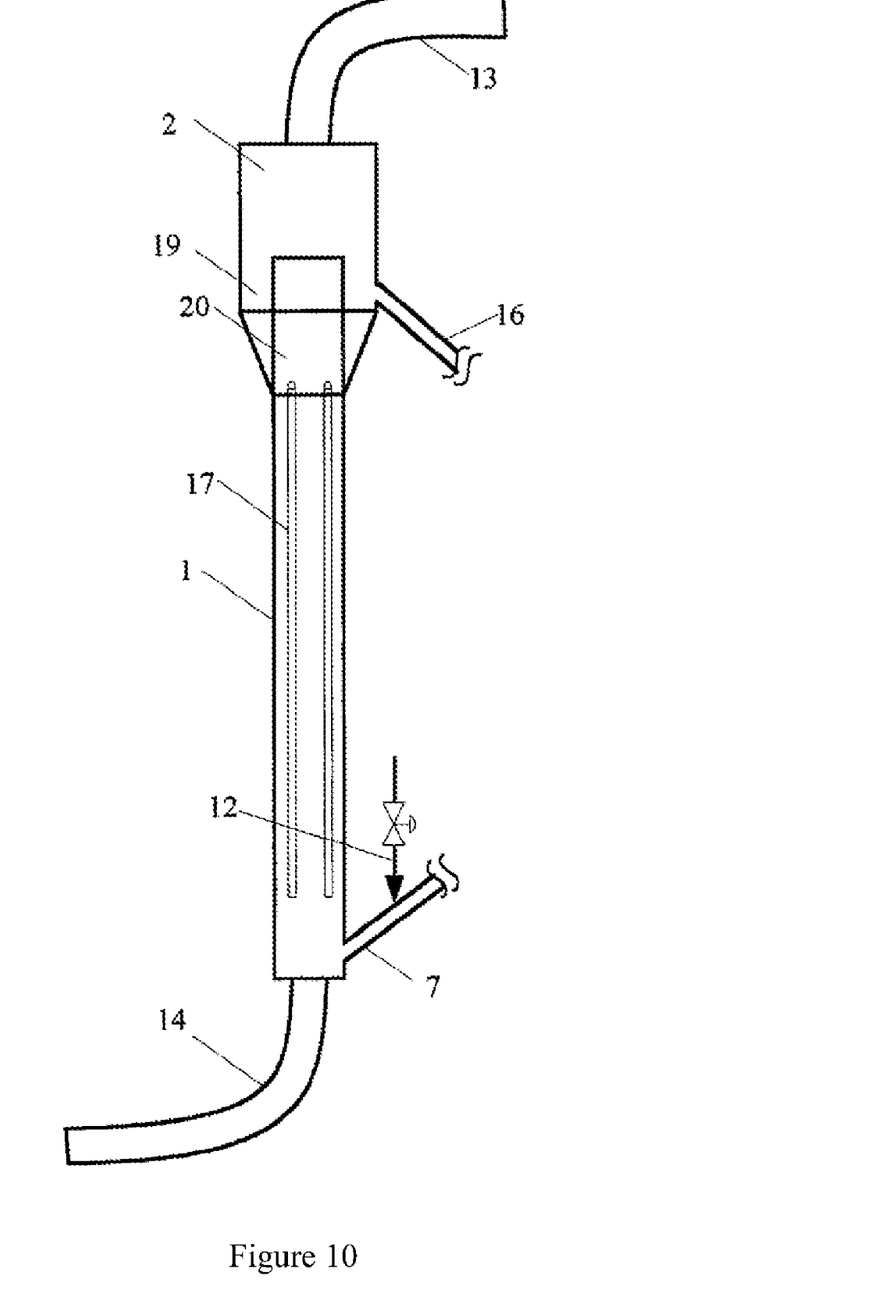
FIG. 10 shows the schematic diagram of the connection of the bottom of said steady flow section with the reaction section via lines.

The reactor as shown in FIG. 10 is used. Said turbulence section (20) is separated from the steady flow section (19) by said cylindrical baffle, and the bottom of said steady flow section (19) is communicated to the lower part of the reaction section via fluid guide pipe(s) (17). The reaction section has size of Ø280×3600 mm. The expanding section of the settling section has a tube diameter of 450 mm and a height of 1000 mm The cylindrical baffle have a size of Ø280×700 mm, and there are 6 fluid guide pipes altogether arranged in a staggered form and having a size of Ø12×3000 mm and Ø12×1500 mm respectively. The outer tube of the downcomers has a size of Ø280×2000 mm, and the inner filter tube is made of metal microporous membrane and has an average pore diameter of 0.2 μm. As shown in FIG. 4, 7 inner filter tubes are arranged in parallel, and each of them has a size of Ø30×1000 mm.

160 L slurry containing solid particles are pre-introduced into the reactor, and the particles in the slurry have a particle size ranging from 1-100 μm. After the air is introduced into the reactor, the superficial gas velocity thereof is 0.06 m/s. The supernatant drawn out from line (10) turns back to the reactor from the bottom thereof. When the differential pressure between the inner and outer tubes of the downcomer is higher than 0.5 MPa, the back purging system goes into operation. The product supernatant is introduced to the outer tube with a pump, and into the inner tube through the wall of the filter tube. The filter cake is purged to the slurry and flows downwardly along with the slurry to the riser. This process lasts several seconds. When the differential pressure between the inner and outer tubes is lower than 0.1 MPa, the back purging system closes, and the slurry bed reactor turns back to the normal operation.

During such process, the flow capacity of the supernatant drawn out from line (10) is 210 L/h; the back purging period is 100 h; the solid particle content in the liquid product is lower than 5 μg/ml; and the maximum diameter of the particles is 1 μm. The separation efficiency is 99.9%.

Example 5

Figure 11:
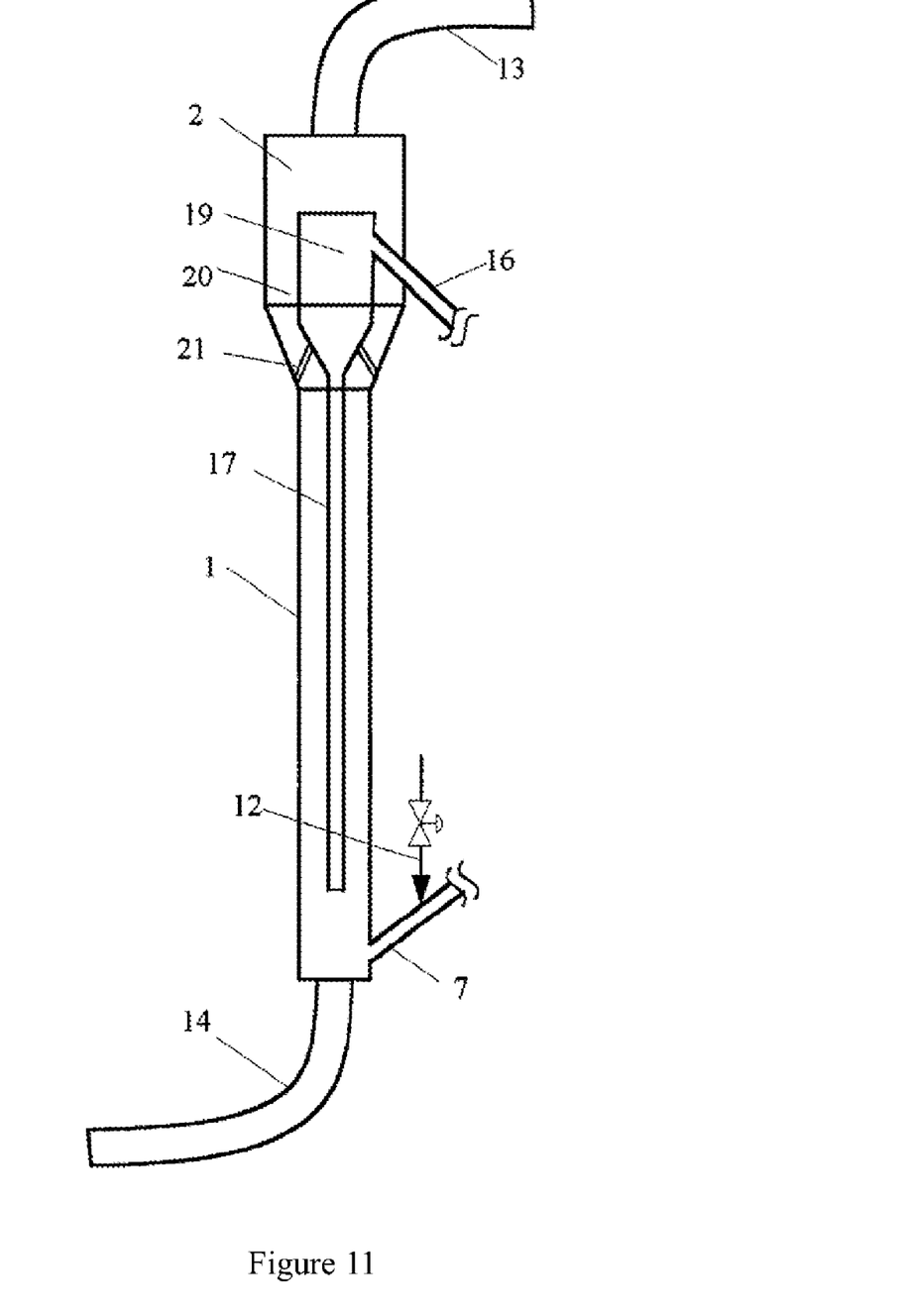
FIG. 11 shows the schematic diagram of dividing the settling section into the turbulence section and steady flow section by cone-shaped cylindrical baffle(s).

The reactor as shown in FIG. 11 is used. Said turbulence section (20) is separated from the steady flow section (19) by said cylindrical baffle; said cone-shaped cylindrical baffle is fixed on the inner walls of the riser via support (21); and the bottom of said steady flow section (19) is connected to the lower part of the reaction section via fluid guide pipe(s) (17). The reaction section has size of Ø280×3600 mm. The expanding section of the settling section has a tube diameter of 450 mm and a height of 1000 mm. The large hole of the crateriform baffle having a fluid guide pipe has a size of Ø150×750 mm, wherein the fluid guide pipe has a size of Ø40×2800 mm. The outer tube of the downcomers has a size of Ø100×1200 mm, and the inner filter tube is made of metal microporous membrane and has an average pore diameter of 1 μm. As shown in FIG. 4, 7 inner filter tubes are arranged in parallel, and each of them has a size of Ø30×1000 mm.

160 L slurry containing solid particles are pre-introduced into the reactor, and the particles in the slurry have a particle size ranging from 1-100 μm. The air is introduced into the reactor from the feed inlet (14), and the superficial gas velocity thereof is 0.08 m/s. The supernatant drawn out from line (10) turns back to the reactor from the bottom thereof. When the differential pressure between the inner and outer tubes of the downcomer is higher than 0.5 MPa, the back purging system goes into operation. The product supernatant is introduced to the outer tube with a pump, and into the inner tube through the wall of the filter tube. The filter cake is purged to the slurry and flows downwardly along with the slurry to the riser. This process lasts several seconds. When the differential pressure between the inner and outer tubes is lower than 0.1 MPa, the back purging system closes, and the slurry bed reactor turns back to the normal operation.

During such process, the flow capacity of the supernatant drawn out from line (10) is 250 L/h; the back purging period is 100 h; the solid particle content in the liquid product is lower than 5 μg/ml; and the maximum diameter of the particles is 1 μm. The separation efficiency is 99.9%.

The invention claimed is:

1. A slurry bed loop reactor comprising a riser and at least one downcomer (3), wherein two ends of the riser are connected to two ends of each downcomer (3) respectively via line (16) and line (7); the riser comprises a reaction section (1) and a settling section (2) with an increased tube diameter disposed on the reaction section (1); a gas outlet (13) exists at the top of the settling section (2); each of the downcomers (3) is divided into a filtrate section (5) and a slurry section (6) by a filter medium (4), wherein the filtrate section (5) is connected to a liquid outlet (10), and two ends of the slurry section (6) are respectively connected to two ends of the riser,
wherein the settling section (2) has a baffle disposed approximately in the vertical direction;
wherein the distance between the upper edge of said baffle and the top of the settling section is $1/10$-$9/10$ of the total height of the settling section;
wherein the section above the upper edge of the baffle in the settling section is a gas-liquid separation section, and the section below the upper edge of the settling section is divided into a turbulence section (20) and a steady flow section (19) by said baffle;
wherein said turbulence section (20) is adjacent to and directly communicated to the reaction section (1), and the bottom of said steady flow section (19) is in liquid communication to the reaction section (1) via hole(s) (18) or fluid guide pipe(s) (17); and
wherein the downcomer is connected via line (16) to the riser at the upper part of the steady flow section, and the position at which the line (16) is connected to the steady flow section ranges from $1/10$ to $9/10$ of the vertical distance between the upper edge of said baffle and the position at which hole(s) (18) or fluid guide pipe(s) (17) is connected to the baffle.

2. The reactor according to claim 1, wherein the tube diameter ratio of the lower reaction section (1) to the upper settling section (2) in the riser ranges from 1:1.1 to 1:10.

3. The reactor according to claim 2, wherein the tube diameter ratio of the lower reaction section (1) to the upper settling section (2) in the riser ranges from 1:1.2 to 1:3.

4. The reactor according to claim 1, wherein the liquid outlet (10) is connected to a back purging system via a line having a valve (9).

5. The reactor according to claim 1, wherein a solid catalysts discharge outlet (11) and a solid catalysts feed inlet (12) are disposed on line (7), which connects the lower end of each downcomer (3) to the lower end of the riser.

6. The reactor according to claim 1, wherein the position at which the line (16) is connected to the steady flow section ranges from $1/3$ to $2/3$ of the vertical distance between the upper edge of said baffle and the position at which hole(s) (18) or fluid guide pipe(s) (17) is connected to the baffle.

7. The reactor according to claim 1 or 6, wherein said baffle comprises a cylindrical baffle; the bottom of said baffle is fixed on the inner wall of the riser; the turbulence section is disposed inside said cylindrical baffle, and the steady flow section surrounds the turbulence section; the bottom of the steady flow section (19) is communicated to with the lower part of the reaction section (1) via fluid guide pipe(s) (17).

8. The reactor according to claim 7, wherein the diameter of the bottom of the cylindrical baffle may be the same as or different from the diameter of other parts of said baffle.

9. The reactor according to claim 1 or 6, wherein said baffle comprises a cone-shaped cylindrical baffle; the cone-shaped cylindrical baffle is fixed on the inner walls of the riser via a support (21); the steady flow section (19) is disposed inside the cone-shaped cylindrical baffle, and the turbulence section (20) surrounds the steady flow section; and the steady flow section (19) is communicated to with the lower part of the reaction section (1) via fluid guide pipe(s) (17) at the bottom of the cone-shaped cylinder.

* * * * *